US010940396B2

(12) United States Patent
Pinto et al.

(10) Patent No.: US 10,940,396 B2
(45) Date of Patent: Mar. 9, 2021

(54) EXAMPLE CHAT MESSAGE TOXICITY ASSESSMENT PROCESS

(71) Applicant: Electronic Arts Inc., Redwood City, CA (US)

(72) Inventors: Jervis Pinto, Foster City, CA (US); Polina Igorevna Gouskova, San Francisco, CA (US); Chetan Nagaraja Rao, Austin, TX (US); Farah Mariam Ali, Bellevue, WA (US); Mohsen Sardari, Redwood City, CA (US); John Kolen, Foster City, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/359,812

(22) Filed: Mar. 20, 2019

(65) Prior Publication Data

US 2020/0298131 A1 Sep. 24, 2020

(51) Int. Cl.
*A63F 13/87* (2014.01)
*A63F 13/79* (2014.01)

(52) U.S. Cl.
CPC .............. *A63F 13/87* (2014.09); *A63F 13/79* (2014.09)

(58) Field of Classification Search
None
See application file for complete search history.

(56) References Cited

U.S. PATENT DOCUMENTS

| 2018/0048721 A1* | 2/2018 | Barajas Gonzalez ....................... G06F 16/215 |
| 2018/0351756 A1* | 12/2018 | Dave ......................... H04N 7/15 |
| 2019/0052471 A1* | 2/2019 | Panattoni ................ A63F 13/75 |

* cited by examiner

*Primary Examiner* — James S. McClellan
*Assistant Examiner* — Peter J Iannuzzi
(74) *Attorney, Agent, or Firm* — Knobbe, Martens, Olson & Bear, LLP

(57) ABSTRACT

Using user-specific prediction models, it is possible to present an individualized view of messages generated by users playing a shared instance of a video game. Further, users with different subjective views of what is offensive may be presented with different forms or annotations of a message. By personalizing the views of messages generated by users, it is possible to reduce or eliminate the toxic environment that sometimes forms when players, who may be strangers to each other and may be located in disparate locations play a shared instance of a video game. Further, the user-specific prediction models may be adapted to filter or otherwise annotate other undesirable messages that may not be offensive, such as a message generated by one user in a video game that includes a solution to an in-game puzzle that another user may not desire to read as it may spoil the challenge for the user.

20 Claims, 8 Drawing Sheets

«EXAMPLE CHAT MESSAGE TOXICITY ASSESSMENT PROCESS»

BACKGROUND

Some video games are designed to enable multiple players to play an instance of the video game together. Many of these multiplayer video games include functionality that enables the players to communicate with each other while they play the video game. Often, this communication takes the form of textual communication, which may be referred to as chat. For instance, one player may type a message using a keyboard and send this message to a particular player or to all other players who are playing the video game with the player that wrote the message.

Often the messages are cordial. For example, the message may include a congratulations message for a well-played game, a welcome message to a new player, or an indication that this is the last game before the player needs to leave. However, there are also some messages that may be less than cordial. In some cases, the less than cordial messages may be offensive to other players. Further, in some extreme cases, some messages may even constitute harassment. These offensive messages can detract from players' experience playing the video game, which may not only negatively impact player retention, but may in some extreme cases may cause psychological harm.

SUMMARY OF EMBODIMENTS

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a computer-implemented method that may be implemented by an interactive computing system configured with specific computer-executable instructions. The computer-implemented method may comprise: receiving a text-based message from a first user computing system accessing a shared instance of a video game, the text-based message obtained from an originating user interacting with the shared instance of the video game, and the video game comprising a multiplayer video game that enables multiple users to play the shared instance of the video game together; identifying a first recipient user interacting with the shared instance of the video game; accessing a first prediction model associated with the first recipient user; providing at least the text-based message to the first prediction model to obtain a predicted toxicity of the text-based message; determining that the predicted toxicity of the text-based message satisfies a toxicity threshold; annotating the text-based message based at least in part on the predicted toxicity; and providing the annotated text-based message to a second user computing system executing the shared instance of the video game for presentation to the first recipient user.

The method of the preceding paragraph can include any combination or sub-combination of the following features: where the text-based message is received at a user interface of the video game executing at the first user computing system; where annotating the text-based message comprises rendering at least a portion of the text-based message unreadable to the first recipient user; where the method further comprises providing to the second user computing system, for presentation to the first recipient user one or more of the following: an indication that the text-based message has been annotated or an indication of a reason that the text-based message has been annotated; where said providing at least the text-based message to the first prediction model to obtain the predicted toxicity of the text-based message comprises: dividing the text-based message into a plurality of segments; and providing each of the plurality of segments to the first prediction model to obtain a predicted toxicity for each of the plurality of segments; where the method further comprises aggregating the predicted toxicity for each of the plurality of segments to obtain the predicted toxicity of the text-based message; where said annotating the text-based message based at least in part on the predicted toxicity comprises annotating a first segment of the plurality of segments associated with a predicted toxicity that satisfies the toxicity threshold while not annotating a second segment of the plurality of segments associated with a predicted toxicity that does not satisfy the toxicity threshold; wherein the method further comprises: accessing context data; and providing at least the text-based message and the context data to the first prediction model to obtain the predicted toxicity of the text-based message; where the context data comprises one or more of the following: a skill level for the originating user; a skill level for the first recipient user; relationship data between the originating user and the first recipient user; demographic data of the first recipient user; demographic data of the originating user; a genre of the video game; demographic data of one or more additional users accessing the shared instance of the video game; relationship data between the first recipient user and the one or more additional users; a type of the second user computing system; or a location of the second user computing system; where the method further comprises: identifying a second recipient user interacting with the shared instance of the video game using a third user computing system; accessing a second prediction model associated with the second recipient user; providing at least the text-based message to the second prediction model to obtain a second predicted toxicity of the text-based message; determining that the second predicted toxicity of the text-based message does not satisfy the toxicity threshold; and providing a non-annotated copy of the text-based message to the third user computing system for presentation to the second recipient user; where the method further comprises generating a global prediction model that determines a prediction of toxicity for text-based messages, wherein said generating the global prediction model comprises: accessing a set of training data, the training data comprising a set of text-based messages with varying levels of toxicity as rated by a set of users; accessing a set of toxicity ratings for each of the text-based messages of the set of text-based messages as determined by the set of users; and using a machine learning algorithm to determine the global prediction model parameter function based at least in part on the set of training data and the set of toxicity ratings; where the method further comprises generating the first prediction model by at least: accessing a global prediction model; presenting a set of training text-based messages to the first recipient user; obtaining a set of toxicity ratings for each of the training text-based messages of the set of training text-based messages from the first recipient user; and modifying the global prediction model based at least in part on the set of training text-based messages and the set of toxicity ratings to obtain the first prediction model; where modifying the global prediction model to obtain the first prediction model comprises providing the global prediction model, the set of training text-based messages, and the set of toxicity ratings to a machine learning algorithm; and where the first user computing system and the second user computing system execute the shared instance of the video game by executing at least a portion of the video game.

Additional aspects of the present disclosure provide a system that comprises an electronic data store configured to store prediction models that predict the offensiveness of chat messages within a video game that permits multiple user to play the video game together; and a hardware processor in communication with the electronic data store. The hardware processor may be configured to execute specific computer-executable instructions to at least: receive a chat message from a first user computing system accessing a shared instance of the video game, the chat message obtained from a first user interacting with the shared instance of the video game; identify a second user interacting with the shared instance of the video game using a second user computing system; access from the electronic data store a first prediction model associated with the second user; provide at least the chat message to the first prediction model to obtain a predicted offensiveness of the chat message; determine that the predicted offensiveness of the chat message satisfies an offensiveness threshold; annotate the chat message based at least in part on the predicted offensiveness; and provide the annotated chat message to the second user computing system for presentation to the second user.

The system of the preceding paragraph can include any combination or sub-combination of the following features: where the hardware processor is further configured to annotate the chat message to render at least a portion of the chat message unreadable to the second user; where the hardware processor is further configured to provide at least the chat message to the first prediction model by at least: dividing the chat message into a plurality of segments; and providing each of the plurality of segments to the first prediction model to obtain a predicted offensiveness for each of the plurality of segments, wherein the hardware processor is further configured to determine the predicted offensiveness of the chat message based on the predicted offensiveness of each of the plurality of segments; where the hardware processor is further configured to: identify a third user interacting with the shared instance of the video game using a third user computing system; access from the electronic data store a second prediction model associated with the third user; provide at least the chat message to the second prediction model to obtain a second predicted offensiveness of the chat message; determine that the second predicted offensiveness of the chat message does not satisfy the offensiveness threshold; and provide a non-annotated copy of the chat message to the third user computing system for presentation to the third user; where the hardware processor is further configured to generate the first prediction model by at least: presenting a set of training chat messages to the second user; obtaining an offensiveness rating for each training chat message of the set of training chat messages from the second user; and using a machine learning algorithm to generate the first prediction model based at least in part on the set of training chat messages and the offensiveness rating for each training chat message of the set of training chat messages; and where the hardware processor is further configured to generate the first prediction model by at least: accessing a global offensiveness prediction model generated based on training data obtained from a plurality of users; presenting a set of training chat messages to the second user; obtaining an offensiveness rating for each training chat message of the set of training chat messages from the second user; and using a machine learning algorithm to modify the global offensiveness prediction model based at least in part on the set of training chat messages and the offensiveness rating for each training chat message of the set of training chat messages to generate the first prediction model.

Yet additional aspects of the disclosure provide a non-transitory computer-readable storage medium storing computer executable instructions that, when executed by one or more computing devices, configure the one or more computing devices to perform a set of operations corresponding to one or more of the embodiments disclosed herein.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1A:
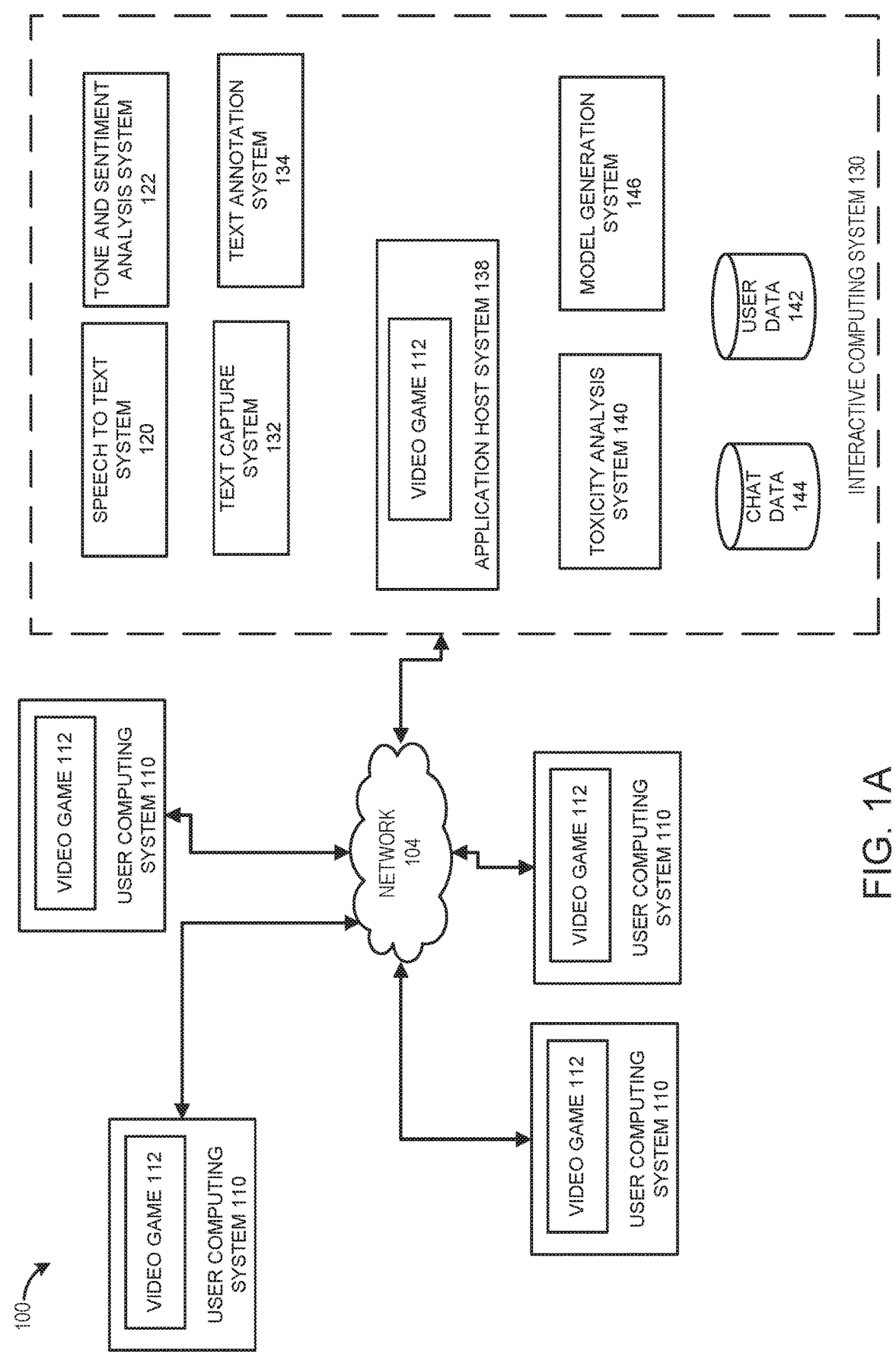
FIG. 1A illustrates an embodiment of a networked computing environment that can implement one or more embodiments of a dynamic video game chat personalization system.

Negative communication between players or users of a video game can cause a number of issues. When one user communicates, such as via an in-game chat interface, an offensive or harassing message, other users may have a negative experience. This negative experience may affect player retention. Further, the offensive messages may cause stress or psychological harm to other players or users. Thus, it is desirable to prevent users from communicating offensive or toxic messages.

Some publishers or entities that host or provide access to multiplayer video games attempt to address the issue of offensive or toxic communication or messages by employing moderators. In some cases, moderators can review messages either in real-time by viewing in-game messages as they occur, or shortly thereafter, to determine whether a player is being offensive. However, having moderators review messages in real-time or near real-time is often impractical because of the volume of instances of the video game that may be played simultaneously. Thus, it is often the case that a moderator will not review communication for toxicity until a complaint is made. As a result, a high-percentage of offensive communication or messages are not flagged or reviewed.

Further, even when a moderator does review a chat message or communication made by a user or set of users, it is possible that the moderator may not accurately identify the offensiveness of the message. The moderator may not accurately determine the offensiveness of the message because different users find different topics or language offensive. Further, a user may find a particular message or topic offensive when playing with the user's children, but not when playing with friends or colleagues. Moreover, without context, a moderator may be unable to accurately determine the offensiveness of a particular message. Certain language may be considered offensive when issued by a stranger, but not offensive when issued by a friend. Moreover, moderators are often not consistent among each other or when viewing different messages. Some moderators may be more lenient or more harsh than other moderators.

As a result, the use of moderators may be imperfect. There are often false positives where a moderator identifies a message as toxic or offensive despite recipients not being offended by the message. And there are often false negatives where a moderator does not identify a message as toxic or offensive despite recipients being offended by the message.

Further, many video games have a relatively large user-base (for example hundreds of thousands of users or even millions of users) with many users playing at different times of day. Moderating messages generated by such a large user-base requires a large number of moderators and often, moderators with availability at different times of the day to match when users are playing the video game. Maintaining such a team of moderators can be costly. Further, it can be stressful and in some cases, harmful to the psychological health of moderators to view and categorize the offensiveness of users' chats for an extended period of time.

As such, it is desirable to have a system that can automatically identify offensive messages. Further, it is desirable to have a system that can more accurately and consistently identify offensive or toxic messages compared to the use of moderators.

Embodiments disclosed herein can include systems and processes that use machine learning to determine the offensiveness or toxicity of messages. Using the determination of toxicity of a message, systems disclosed herein can block or annotate the message to prevent offensive content from being displayed to users. Further, embodiments disclosed herein can use machine learning to modify a prediction of parameter function to generate a user-specific measure of toxicity of the message. Advantageously, by applying a message to a user specific parameter function, systems disclosed herein can perform user specific message annotation. In other words, in certain embodiments, a particular message may be shown to a first user without annotation, shown to a second user with annotation, and not be displayed to a third user based on a user specific determination of the offensiveness or toxicity of the message.

Although embodiments described herein are primarily described with respect to determining whether a message is offensive or toxic to users, present disclosure is not limited as such. For example, embodiments disclosed herein may be used to determine whether messages include undesired content regardless of the offensive nature of the content. For example, certain users may desire not to see spoilers or hints about overcoming a challenge within the video game. For users who enjoy the thrill of discovery or the challenge in overcoming an obstacle within the video game without assistance, messages may be sanitized of content that may provide spoilers or hints for overcoming obstacles using embodiments disclosed herein.

To simplify discussion, the present disclosure is primarily described with respect to a video game. However, the present disclosure is not limited as such may be applied to other types of applications. For example, embodiments disclosed herein may be applied to educational applications or other applications that permit users to communicate with each other via, for example, chat messages within the application or via a supporting application or service that can integrate with the application. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Example Networked Computing Environment

FIG. 1A illustrates an embodiment of a networked computing environment 100 that can implement one or more embodiments of a dynamic video game chat personalization system. The networked computing environment 100 includes a number of user computing systems 110 they can communicate with an interactive computing system 130 via a network 104. Although four user computing systems 110 are illustrated, present disclosure is not limited as such and the network computing environment 100 may have a fewer or greater number of user computing systems 110. For example, the network computing environment 100 may have hundreds, thousands, tens of thousands, hundreds of thousands, or millions of user computing systems 110 with each user computing system 110 enabling one or more users to interact with the video game 112. Further, although each of the user computing systems 110 are depicted identically, it should be understood that one or more of the user computing systems 110 may be configured differently. For simplicity, the user computing system 110 will be described in the singular. However, it should be understood that any description of the user computing system 110 may apply to one or more of the depicted user computing systems 110 and may or may not apply to each of the depicted user computing systems 110.

User computing system 110 may include or host a video game 112. In some cases, the video game 112 may execute entirely on the user computing system 110. In other cases, the video game 112 may execute at least partially on the user computing system 110 and at least partially on the interactive computing system 130. In some cases, the video game 112 may execute entirely on the interactive computing system 130, but a user may interact with the video game 112 via the user computing system 110. For example, the game may be a massively multiplayer online role-playing game (MMORPG) that includes a client portion executed by the user computing system 110 and a server portion executed by one or more application host systems 138 that may be included as part of the interactive computing system 130. As another example, the video game 112 may be an adventure game played on the user computing system 110 without interacting with the interactive computing system 130. In some cases, the video game 112 may be a multiplayer video game 112 that enables multiple users to play an instance of the video game 112 using a peer-to-peer architecture that enables multiple user computing systems 110 to communicate with each other without communicating with the interactive computing system 130.

During interaction with the video game 112, users may communicate with each other using, for example, chat messaging functionality provided within the video game 112 or using another application that can enable chat services within the video game 112. The interactive computing system 130 may obtain the chat messages generated by users utilizing a user interface and determine whether the chat messages include offensive, toxic, or otherwise undesirable content. Interactive computing system 130 may block or annotate chat messages that are determined, within a threshold degree of probability, to include offensive, toxic, or otherwise undesirable content. The annotated chat message may be provided to a user computing system 110 as a substitute for the chat message with the offensive content, enabling the user computing system 110 to present the annotated chat message to a user in place of the chat message with the offensive content.

Interactive computing system 130 may include a number of systems or subsystems for facilitating the determination of a toxicity level or offensiveness level of messages generated by users interacting with a video game 112, and/or to improve the annotation or modification of messages determined to satisfy or exceed a threshold level of a toxicity or offensiveness. These systems or subsystems can include a text capture system 132, a text annotation system 134, and a toxicity analysis system 140. Further, the interactive computing system 130 may include one or more repositories for storing data used to facilitate performing the processes described herein. For example, these repositories may include a user data repository 142 and a chat data repository 144. It should be understood that the interactive computing system 130 may include more or fewer repositories for the optimal storage and management of data used with the processes described herein.

The text capture system 132 may include any system that can obtain a message or a copy of a message entered into a user interface (for example a chat interface) by a user (who may be referred to as an originating user) interacting with the video game 112 at a user computing system 110. The text capture system 132 may obtain the message prior to the message being communicated to one or more other user computing systems 110 for presentation to one or more other users. In certain embodiments, the text capture system 132 obtains a copy of the message subsequent to a user interacting with a control of the user interface to communicate the message to other users accessing the video game 112 that other user computing systems 110. Accordingly, in certain embodiments, a message entered by a user into a user interface to the video game 112 that is not sent to other users may not be accessed by the text capture system 132. In other embodiments, the text capture system 132 may obtain access to messages entered into a user interface regardless of whether the user requests, for example via the user interface or a command, that the messages be communicated to other users.

The toxicity analysis system 140 can include one or more systems for determining a predicted toxicity or offensiveness of a message. The toxicity analysis system 140 may provide the message to a parameter or prediction function generated by the model generation system 146 to determine the predicted toxicity or offensiveness of the message. In some embodiments, if the predicted toxicity or offensiveness of the message exceeds or satisfies a threshold, the toxicity analysis system 140 may determine that the message is offensive. In some embodiments, the toxicity analysis system 140 may apply one or more pieces of context data to the parameter function in addition to the message to facilitate determining the likely offensiveness of the message. Further, in some embodiments, the toxicity analysis system 140 may select one or more parameter functions to determine the offensiveness of the message based on identity of one or more users that may receive or be presented the message. Thus, in certain environments, a determination of the offensiveness of the message may be specific to the particular users that may be presented the message via, for example, a display of the user computing system 110 or a display in communication with the user computing system 110.

The text annotation system 134 can include any system that can modify the message before it is provided to one or more user computing systems 110 for presentation to one or more users, which may be referred to as recipient users. The text annotation system 134 may modify the message based on the determination of the toxicity analysis system 140 of a predicted offensiveness of the message. Modifying the message may include deleting or graying out part of the message before it is provided to a user computing system 110 of a recipient user. Alternatively, or in addition, modifying the message may include preventing the message from being provided to the user computing system 110 of a recipient user. In some embodiments, the text annotation system 134 may provide an indication to an originating user or a recipient user of why a message generated by the originating user was annotated or blocked from being provided to the recipient user.

The interactive computing system 130 may further include the model generation system 146, which may generate one or more prediction models or parameter functions usable by the toxicity analysis system 140 to determine a predicted offensiveness of a message. The model generation system 146 can use one or more machine learning algorithms to generate one or more prediction models or parameter functions. One or more of these prediction models may be used to determine an expected value or occurrence based on a set of inputs. For example, a prediction model can be used to determine an expected toxicity of a chat message or a probability that a user will consider a chat message offensive based on one or more inputs to the prediction model, such as, for example, historical user ratings of the offensiveness of messages, user attributes, characteristics, or demographics, or characteristics of the video game 112, similar video games, or other video games generally. In some cases, the prediction model may be termed a prediction model because, for example, the output may be or may be related to a prediction of an action or event, such as a prediction the user continues to play the video game 112 when presented with messages of a particular toxicity level, or a prediction of a state, such as the emotional state of the user including, in some cases, whether the user is offended by a message. A number of different types of algorithms may be used by the model generation system 146. For example, certain embodiments herein may use a logistical regression algorithm. However, other algorithms are possible, such as a linear regression algorithm, a discrete choice algorithm, or a generalized linear algorithm.

The machine learning algorithms can be configured to adaptively develop and update the models over time based on new input received by the model generation system 146. For example, the models can be regenerated on a periodic basis as new user information (for example, additional message ratings) is available to help keep the predictions in the model more accurate as the user information evolves over time. The model generation system 146 is described in more detail herein. After a model is generated, it can be provided to the toxicity analysis system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The user data repository 142 can store message ratings associated with one or more users' rating of the level of offensiveness of a message. In some embodiments, the message ratings may be associated with the video game 112 and/or one or more other video games. By associating message ratings with the video game 112 or a genre of a video game, it is possible to generate different prediction models for different video games 112. Different prediction models for different video games or video game genres may be desirable because a user may have a different reaction to a message based on the video game being played. For instance, a particular message may not offend a particular user playing a violent or highly competitive game, but the same message may offend the user when playing a puzzle game or a game intended for children. The message ratings can be obtained over one or more play sessions of the video game 112 or based on ratings of messages presented during a setup process before the user plays the video game 112. Further, the user data repository may store one or more parameter functions or prediction models associated with a user. In some cases, at least some of the data stored in the user data repository 142 may be stored at a repository of the user computing system 110. Each of the repositories described herein may include non-volatile memory or a combination of volatile and nonvolatile memory.

The chat data repository 144 may include training data that can be supplied to the model generation system 146 to generate a parameter function. This training data may include messages reviewed by a set of users and an indication of the offensiveness of the messages. In some cases, the set of users may be a set of moderators, administrators, or other users associated with a designer or publisher of the video game 112. In other cases, the set of users may be a set of users that are unaffiliated with the publisher of the video game 112.

Although the present disclosure is primarily described with respect to determining the offensiveness of text or written messages communicated between users of a video game 112, the present disclosure is not limited as such. In certain embodiments, systems and processes described herein may be used to determine the offensiveness of spoken communication between users of the video game 112. In certain embodiments, to facilitate determining the offensiveness of spoken communication, interactive computing system 130 may include a speech to text system 120 and a tone and sentiment analysis system 122.

The speech to text system 120 may include any system that can receive an audio signal and convert it to text. Further, the speech to text system 120 may identify audio signals associated with non-alphanumeric communication and convert the non-alphanumeric communication to representative text. For example, an audio signal associated with a moan or grunt could be converted to text indicating that the user moaned or grunted. The representative text may be supplied to the toxicity analysis system 140 to determine or to predict the offensiveness of the text corresponding to words or sounds spoken by an originating user.

The tone and sentiment analysis system 122 may include any system that can determine a tone or sentiment of audio data. For example, the tone and sentiment analysis system 122 may receive text from the speech to text system 120 and may determine, based at least in part on the text, the sentiment of the user's speech. As another example, the tone and sentiment analysis system 122 may process audio received from a microphone of the user computing system 110 to determine a tone of the of the user's speech. The tone and/or sentiment information may be provided to the toxicity analysis system 140 facilitate the toxicity analysis system 140 determining the offensiveness of text converted from audio provided to the toxicity analysis system 140.

Each of the aforementioned systems of the interactive computing system 130 may be implemented in hardware, and software, or a combination of hardware and software. Further, each of the systems may be implemented in a single computing system comprising computer hardware or in one or more separate or distributed computing systems. Moreover, while the systems are shown in FIG. 1A to be stored or executed on the interactive computing system 130, it is recognized that in some embodiments, part or all of the systems can be stored and/or executed on the user computing system 110.

The user computing system 110 may include hardware and software components for establishing communications over a communication network 104. For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIGS. 5 and 6.

In some embodiments, when the user computing system 110 is connected or in communication with the interactive computing system 130 via the network 104, the interactive computing system 130 may perform the processes described herein. However, in some cases where the user computing system 110 and the interactive computing system 130 are not in communication, the user computing system 110 may perform certain processes described herein to determine the toxicity or offensiveness of a message and to block or annotate messages identified as toxic or offensive.

As previously described, in some embodiments, the video game 112, or a portion thereof, may be hosted by an application host system 138 of the interactive computing system 130. For example, a MMORPG may have a portion executed or hosted on the user computing system 110 and a portion executed or hosted on an application host system 138 of the interactive computing system 130.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Model Generation System

Figure 1B:
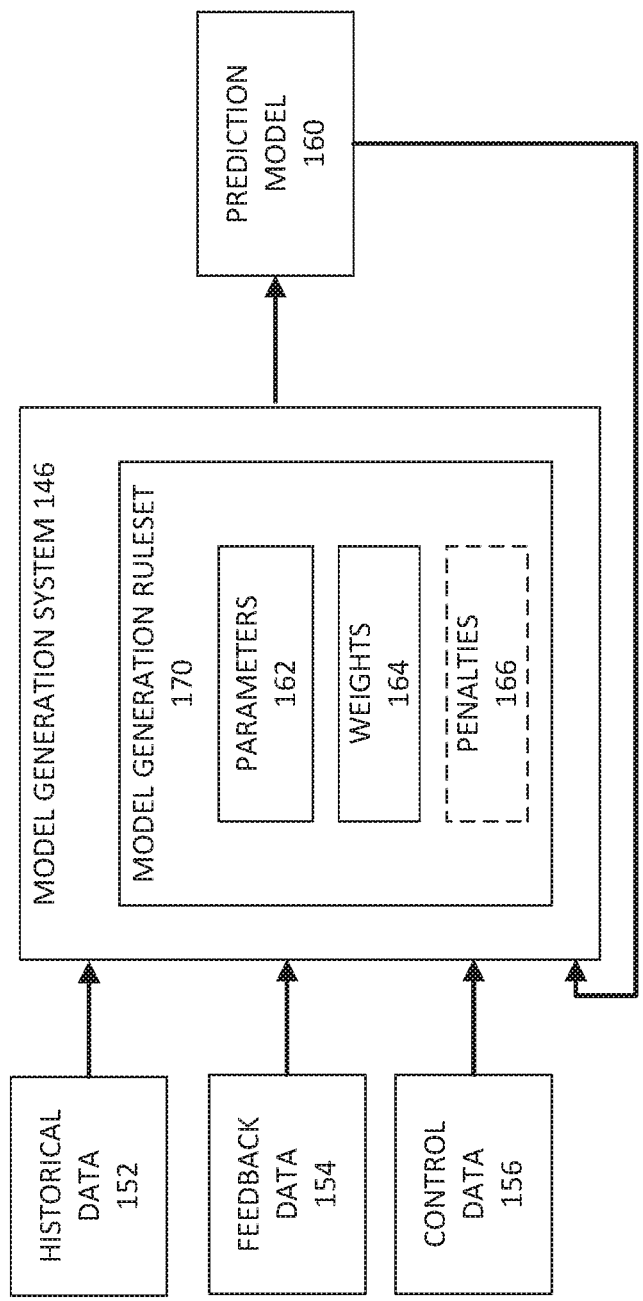
FIG. 1B illustrates an embodiment of a model generation system of FIG. 1A.

FIG. 1B illustrates an embodiment of the model generation system 146 of FIG. 1A. The model generation system 146 may be used to determine one or more prediction models 160 based on historical data 152 for a number of users. Typically, although not necessarily, the historical data 152 includes data associated with a large number of users, such as hundreds, thousands, hundreds of thousands, or more users. However, the present disclosure is not limited as such, and the number of users may include any number of users. Further, the historical data 152 can include data received from one or more data sources, such as, for example, an application host system (not shown) and/or one or more user computing systems 110. Further, the historical data 152 can include data from different data sources, different data types, and any data generated based on a user's evaluation of the offensiveness or toxicity of one or more text messages or chats that may be received when interacting with the video game 112. These text messages may be received during interaction with the video game 112, or may be presented to users as an example of different messages that a user may receive from other users when interacting with the video game 112. The historical data may generally include sets of real-world text-based or chat messages generated by users interacting with the video game 112 and/or sets of sample text messages generated by an administrator or video game publisher. Further, the historical data may include offensiveness or toxicity ratings of the text-based messages. These text-based messages may be alphanumeric. The text-based messages may also include emoji, emoticons, or other symbolic communications. In some cases, the text-based messages may be generated from spoken messages.

In some embodiments, the historical data 152 may include a very large number of data points, such as millions of data points, which may be aggregated into one or more data sets. In some cases, the historical data 152 may be accessed from a user data repository 142 or a chat data repository 144. In some embodiments, the historical data 152 is limited to historical information or messages associated with a particular video game 112, but in other embodiments, the historical data 152 may include information from one or more other video games. In some cases, the other video games are similar (for example, the same genre, the same theme, the same or similar types of objectives, and the like). In other cases, the video games that provide the historical data 152 are not limited in type or similarity. Further, in some embodiments, one or more subsets of the historical data may be limited by a date restriction, such as for example, limited to include only data from the last 6 months, data that is between 3-6 months old, or data less than a year old.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to handle the tagged data differently, such as by applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine an offensiveness of a message that a user sent to another user when interacting with the video game 112. If it is known whether the message is offensive to users generally, users of a certain age, users of a certain gender, or to users playing a particular genre of video game, this data may be provided as part of the control data 156, or as part of the historical data 152.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the model based on a defined objective function, such as determining a churn rate or an emotional state of a user. In some embodiments, initial parameters 162 and weights 164 can be manually provided during the initiation of the model generation process. The parameters 162 and weights 164 can be updated and modified during the model generation phase to generate the prediction model 160.

The model generation system 146 can filter and categorize the historical data sets according to various characteristics and parameters of the data. For example, the data can be categorized by the data source (such as, for example, game application data, host application data, or user profile data), information type (such as, for example, gameplay information, transaction information, interaction information, game account information), or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

Optionally, one or more of the prediction models 160 may be associated with a penalty 166. These penalties 166 may be used to facilitate the generation of or selection of a particular prediction model 160 based on one or more factors that are used to derive the penalty. For example, the mathematical complexity or the number of parameters included in a particular prediction model 160 may be used to generate a penalty for the particular prediction model 160, which may impact the generation of the model and/or a selection algorithm or a selection probability that the particular prediction model 160 is selected.

After the prediction model 160 has been generated, the model can be used during runtime of the toxicity analysis system 140 to determine a predicted offensiveness of a particular message, or portion of the message.

In certain embodiments, the model generation system 146 may be used to generate a personalized prediction model that predicts the offensiveness of a message to a particular user. To generate the personalized prediction model, a user may be presented with a set of training messages and asked to rate the offensiveness on a binary scale, or on some other scale of offensiveness. The set of training messages and the ratings of offensiveness may be supplied to the model generation system 146 as training data in place of the historical data 152.

In certain embodiments, the prediction model 160 generated based at least on the historical data 152 may be provided as an input to the model generation system 146 as a default starting model for determining a personalized prediction model for a user. This prediction model 160 may be referred to as a global or community prediction model. Additional messages presented to a user, either during a training process or during one or more game sessions of the video game 112, and corresponding offensiveness ratings may be supplied in place of the historical data 152 as training data. Based on this training data, the model generation system 146 may modify or update the global prediction model 160 to obtain a personalized prediction model for the user.

Example Toxicity Analysis System

Figure 1C:
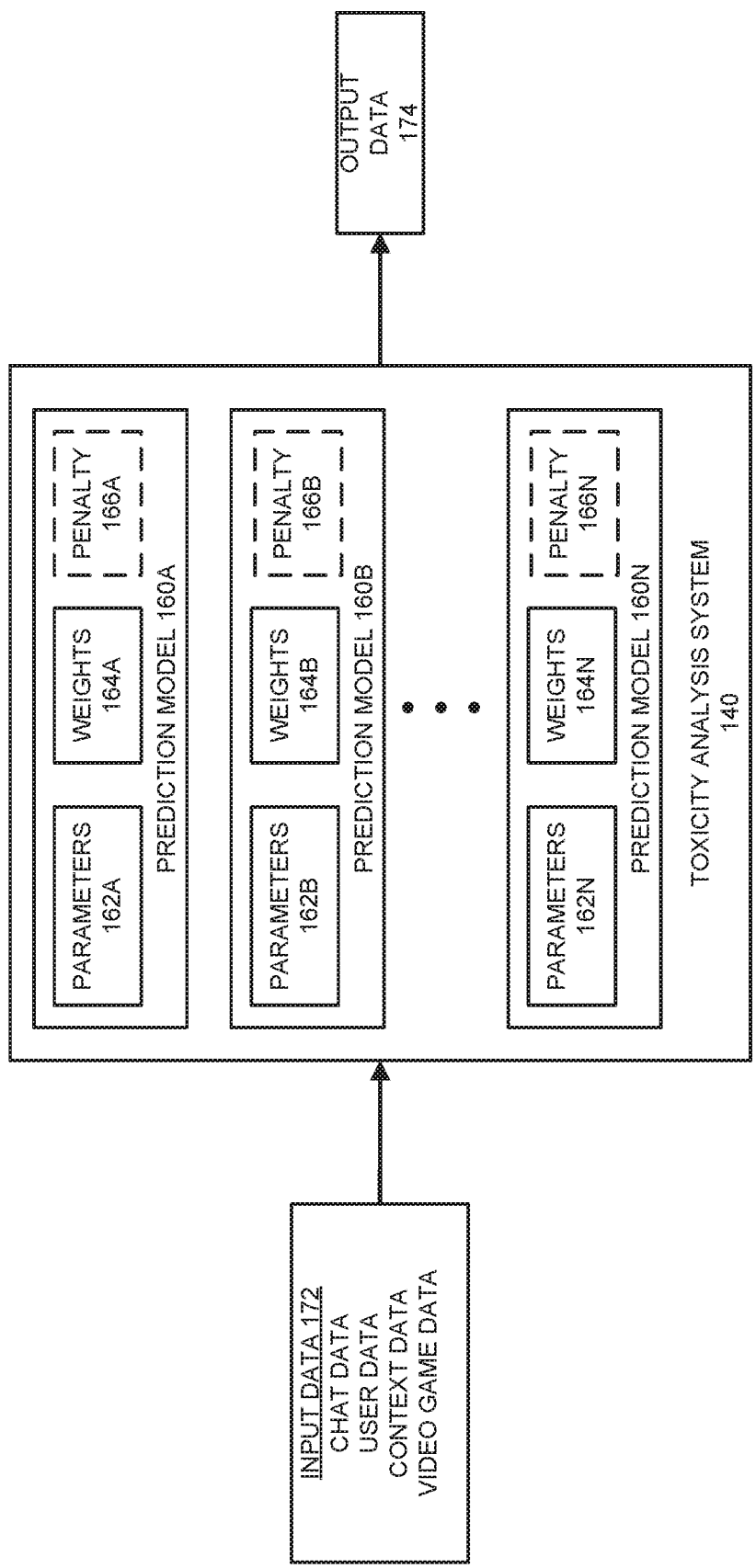
FIG. 1C illustrates an embodiment of a toxicity analysis system of FIG. 1B.

FIG. 1C illustrates an embodiment of a toxicity analysis system 140 of FIG. 1A. The toxicity analysis system 140 can apply or use one or more of the prediction models 160 generated by the model generation system 146. The toxicity analysis system 140 may use one or more prediction models 160A, 160B, 160N (which may be referred to collectively as "prediction models 160" or in the singular as "prediction model 160") to process the input data 172 to obtain the output data 174. The prediction models 160 may also be referred to as parameter models.

In some embodiments, at least some of the prediction models 160 may be associated with different users. Further, at least some of the prediction models 160 may be associated with different video games or different video game genres. In certain embodiments, a user may be associated with multiple prediction models. For example, a user may be associated with prediction model 160A and 160B. Continuing the previous example, the toxicity analysis system 140 may use the prediction model 160A when the user plays video games of a first genre (for example first-person shooter games or games intended for an adult audience) and may use the prediction model 160B when the user plays video games of a second genre (for example, adventure games or games intended for children below a particular age). In some embodiments, at least one of the prediction models 160 may be a global prediction model that is not associated with a particular user. This global prediction model may be used to predict the offensiveness of messages for a user that is not associated with a prediction model.

The toxicity analysis system 140 may apply the prediction model(s) 160 upon receipt of a message written or otherwise generated by a user using a user interface provided by the video game 112 or another application that may interface with the video game 112. During determination of the toxicity or offensiveness of a message, the toxicity analysis system 140 receives input data 172 that can be applied to one or more of the prediction models 160. In some embodiments, the input data 172 can be filtered before it is provided to the toxicity analysis system 140. The input data may be filtered to remove data that is beyond an age threshold or that may not be relevant to a selected prediction model 160.

The input data 172 can include the message itself, or a portion thereof. This message or message segment may be referred to as the chat data. Further, the input data 172 can include additional data that may facilitate predicting the offensiveness of the message. This additional input data 172 may include user data, context data, video game data, and any other data that may modify the offensiveness of a message to a particular user or that may help predict the offensiveness of a message.

The user data may include any data about the recipient user that is receiving the message and/or an originating user that generated the message. For example, the user data may include a skill level of the originating user and or recipient user with respect to the video game 112, demographic data (for example age, gender, socioeconomic class, and the like) of the recipient user, demographic data of the originating user demographic data of one or more additional users accessing the video game 112, and the like.

The context data include any data that provides additional context to the users playing the video game 112, generating the message, or receiving the message. For example, the context data may include relationship data between the originating user and the recipient user (for example, whether the originating user and the recipient user are friends or relatives), relationship data between the recipient user and one or more additional users, historical interactions between the originating user and the recipient user within the video game 112, and the like. In certain embodiments, relationship data between the users may be obtained based on a social networking component of the video game 112 and/or based on registration information provided to a publisher or host of the video game 112. For example, may be determined that two users are a parent and a child based on information provided when the parent registered or created an account for the child to play the video game 112. In some cases, relationship between users may be determined from a social networking application that is separate or independent from the video game 112.

The video game data may include any data that relates to the video game 112 itself or the user computing system 110. For example, the video game data may include a genre of the video game, and intended or target age for users playing the video game, the type of computing system of the user computing system 110 (for example, a portable computing system, a desktop computing system, a smart phone, a game console, and the like), a location of the user computing system, a location of the user playing the video game (for example, at home, in a public space, and the like), and the like. In some embodiments, the location information may be determined based on the type of the user computing system. In some cases, the location of the user may be a proxy for determining whether the user is playing alone, playing with observers, or playing with children. Whether the user is playing alone or not may impact the likelihood that a user may find particular message offensive.

In some embodiments, a single prediction model 160 may exist for the toxicity analysis system 140. However, as illustrated, and described above, it is possible for the toxicity analysis system 140 to include multiple prediction models 160. The toxicity analysis system 140 can determine which prediction model, such as any of models 160A-N, to use based on input data 172 and/or additional identifiers associated with the input data 172, such as an identity of the user or an identity of the video game 112. Additionally, the selection of a prediction model 160 may be based on the specific input data 172 provided. The availability of particular types of data as part of the input data 172 can affect the selection of the prediction model 160. For example, the inclusion of demographic data (for example, age, gender, first language) as part of the input data may result in the use of prediction model 160A. However, if demographic data is not available for a particular user, then prediction model 160B may be used instead.

As mentioned above, one or more of the prediction models 160 may have been generated with or may be associated with a penalty 166. The penalty may be used to impact the generation of the model or the selection of a prediction model for use by the toxicity analysis system 140.

The output data 174 can be a measure of offensiveness or toxicity of a message. Alternatively, or in addition, the output data 174 may be a probability that a user is offended or considers a message offensive. For example, in some embodiments, the measure of offensiveness may be between 0 and 100 indicating the predicted percentage of users associated with similar or the same data as included as input data 172 who would be offended by the message supplied by the originating user.

In some cases, the output data 174 may also identify a reason the message if predicted to be offensive. For example, the toxicity analysis system 140 may indicate that the 90% offensiveness measure or prediction for a particular message is based at least in part on the use of sexually-charged language. However, the toxicity analysis system 140 may indicate that the 90% prediction that another message is offensive may be based at least in part on the use of cursing or on the message attaching a user's intelligence. As another example, the toxicity analysis system 140 may predict that a first user is 95% likely to consider a message offensive because the message includes foul language and it is determined that the particular user is playing with his or her child. In the same example, the toxicity analysis system 140 may predict that the same message is only 5% likely to be offensive to a second user who is not disturbed by foul language. In a further example, the toxicity analysis system 140 may determine that the same message is only 10% likely to be offensive to the first user when it is determined that the user is playing only with adults.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A). Optionally, one or more of the prediction models 160A, 160B, 160N may be associated with a penalty 166A, 166B, 166N, respectively (which may be referred to collectively as "penalties 166").

Example Machine Learning Process

Figure 2:
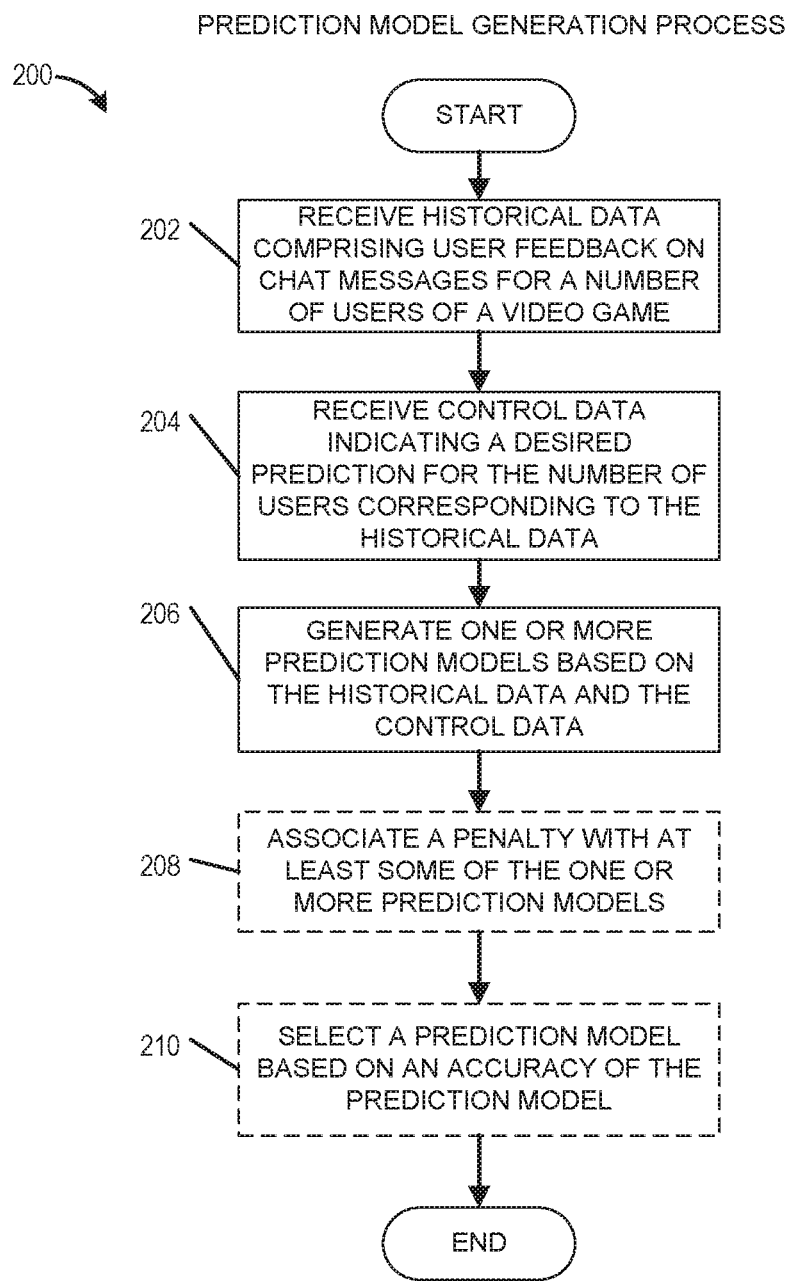
FIG. 2 presents a flowchart of an embodiment of a prediction model generation process.

FIG. 2 presents a flowchart of an embodiment of a prediction model generation process 200. The process 200 can be implemented by any system that can generate one or more parameter functions or prediction models that include one or more parameters. In some cases, the process 200 serves as a training process for developing one or more parameter functions or prediction models based on historical data or other known data. The process 200, in whole or in part, can be implemented by, for example, an interactive computing system 130, a toxicity analysis system 140, a model generation system 146, or a user computing system 110, among others. Although any number of systems, in whole or in part, can implement the process 200, to simplify discussion, the process 200 will be described with respect to particular systems. Further, it should be understood that the process 200 may be updated or performed repeatedly over time. For example, the process 200 may be repeated once per month, with the addition or release of a new video game, with the generation of or access to an additional set of training data, or with the addition of a threshold number of new users available for analysis or who are playing a video game 112. However, the process 200 may be performed more or less frequently.

The process 200 begins at block 202 where the model generation system 146 receives historical data 152 comprising user feedback on chat or text-based messages for a number of users of the video game 112. The feedback may include any type of feedback that indicates a user's opinion of the message. Typically the opinion relates to whether the user considers the message offensive or to the degree that the user considers the message offensive. However, in some cases, the opinion may relate to other desired considerations of the message. For instance, the opinion or rating may relate to the degree that the message reveals, or otherwise spoils, information about a portion (for example a storyline or an encounter) of the video game in advance of the user playing or otherwise reaching the portion of the video game. As another example, the opinion or rating of the message may relate to the degree that the message incorporates hints for overcoming obstacles in a video game.

The feedback may be on a binary scale (for example thumbs up if the message is not offensive or thumbs down if the message is offensive to the user), which may be converted to a numerical value for purposes of generating the prediction model. Alternatively, or in addition, the feedback may be on a larger scale that enables a more nuanced measure of the offensiveness of a particular chat message. In some embodiments, the feedback may be based on complaints to moderators or other video game administrators, which may then be incorporated into the training data.

The historical data 152 may serve as training data for the model generation system 146 and may include, in addition to the user feedback on training messages, user demographics or characteristics, such as age, geographic location, gender, or socioeconomic class. In addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; and the like. This additional historical data may be combined with or associated with the user feedback on the training messages.

Generally, the historical data 152 is for a plurality of users. These users may be users that have played the video game 112 and issued a number of chat messages, which moderators or the users themselves may have rated. Alternatively, the users may have been presented a set of test or training data to rate with respect to offensiveness independent of a particular video game 112. In certain embodiments, the historical data 152 may be related to a single user. For example, the process 200 may be used to generate a user-specific prediction model. In other embodiments, the process 200 is used to generate a global or community prediction model, and the process 300 (described in more detail below) is used to generate the user-specific prediction model.

At block 204, the model generation system 146 receives control data 156 indicating a desired prediction for the number of users corresponding to the historical data. This control data 156 may indicate one or more features or characteristics for which the model generation system 146 is to determine a model. Alternatively, or in addition, the control data 156 may include a value for the features or characteristics that are associated with the received historical data 152.

For example, the control data 156 may identify a level of toxicity or offensiveness, a value associated with the level of toxicity of offensiveness (for example, 0 for a non-offensive message, 50 for a somewhat offensive message, and 100 for a highly offensive message), or a range of values associated with different levels of toxicity of offensiveness of a message, as the desired feature to be predicted by the model that is to be generated by the model generation system 146. As the level of offensiveness of a message can be subjective, the values applied to the level of toxicity may vary and may be selected by an administrator or entity that is implementing the embodiments described herein. Thus, control data 156 may vary for different implementations of the embodiments disclosed herein.

As another example, the control data 156 may identify churn rate, or retention rate, as the desired feature to be predicted by the model that is to be generated by the model generation system 146. The churn rate or retention rate may correspond to a percentage of users associated with the historical data 152 that ceased playing the video game 112 because, for example, of the degree of offensiveness or the quantity of offensive messages presented to a user while playing the video game 112. Further, the control data 156 may identify a retention rate associated with the historical data. For example, the control data 156 may indicate that the retention rate is 60% for certain of the users whose data is included in the historical data 152. In some embodiments, the control data 156 may include multiple characteristics or features to be predicted by the model to be generated by the model generation system 146. For example, the control data 156 may identify both a degree of offensiveness of messages included in the training data, a retention rate, and/or a reason for the retention rate (such as the degree of offensiveness of the training messages).

At block 206, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 206 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model generation process. For example, suppose a supervisor of the machine learning process is aware that a subset of users that provided the training data are from a particular culture that has an increased sensitivity to particular topics or types of language. In such a case, the supervisor may supply feedback data 154 to increase the weight of a portion of the historical data 152 that may correspond to the subset of users from the particular culture when the machine learning process is being used to generate a prediction function to be used with players from the particular culture. Similarly, the supervisor may supply feedback data 154 to decrease the weight of the portion of the historical data 152 that corresponds to the subset of users from the particular culture when the machine learning process is being used to generate a prediction function to be used with players that are not from the particular culture.

In some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160. In some cases, certain types of data may be considered more valuable than other types of data and may therefore be weighted more heavily. For example, messages of a length within a particular range may be weighted more heavily than messages that have a length that is not within the particular range. For instance, it may be more difficult to determine the offensiveness of a message that is a few characters or a message that is several sentences in length. In some embodiments, messages may be divided into segments of a particular size range, or combined with other messages to improve the analysis of the toxicity of the messages.

Optionally, at block 208, the model generation system 146 applies a penalty 166 to or associates a penalty 166 with at least some of the one or more prediction models 160 generated at block 206. The penalty associated with each of the one or more prediction models 160 may differ. Further, the penalty for each of the prediction models 160 may be based at least in part on the model type of the prediction model 160 and/or the mathematical algorithm used to combine the parameters 162 of the prediction model 160, and the number of parameters included in the parameter function. For example, when generating a prediction model 160, a penalty may be applied that disfavors a very large number of variables or a greater amount of processing power to apply the model. As another example, a prediction model 160 that uses more parameters or variables than another prediction model may be associated with a greater penalty 166 than the prediction model that uses fewer variables. As a further example, a prediction model that uses a model type or a mathematical algorithm that requires a greater amount of processing power to calculate than another prediction model may be associated with a greater penalty than the prediction model that uses a model type or a mathematical algorithm that requires a lower amount of processing power to calculate.

The model generation system 146, at block 210, based at least in part on an accuracy of the prediction model 160 and any associated penalty, selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 210 may be optional or omitted. For example, in some cases, the prediction models 160 may not be associated with a penalty. In some such cases, a prediction model may be selected from a plurality of prediction models based on the accuracy of the output generated by the prediction model.

Example Machine Learning Process

Figure 3:
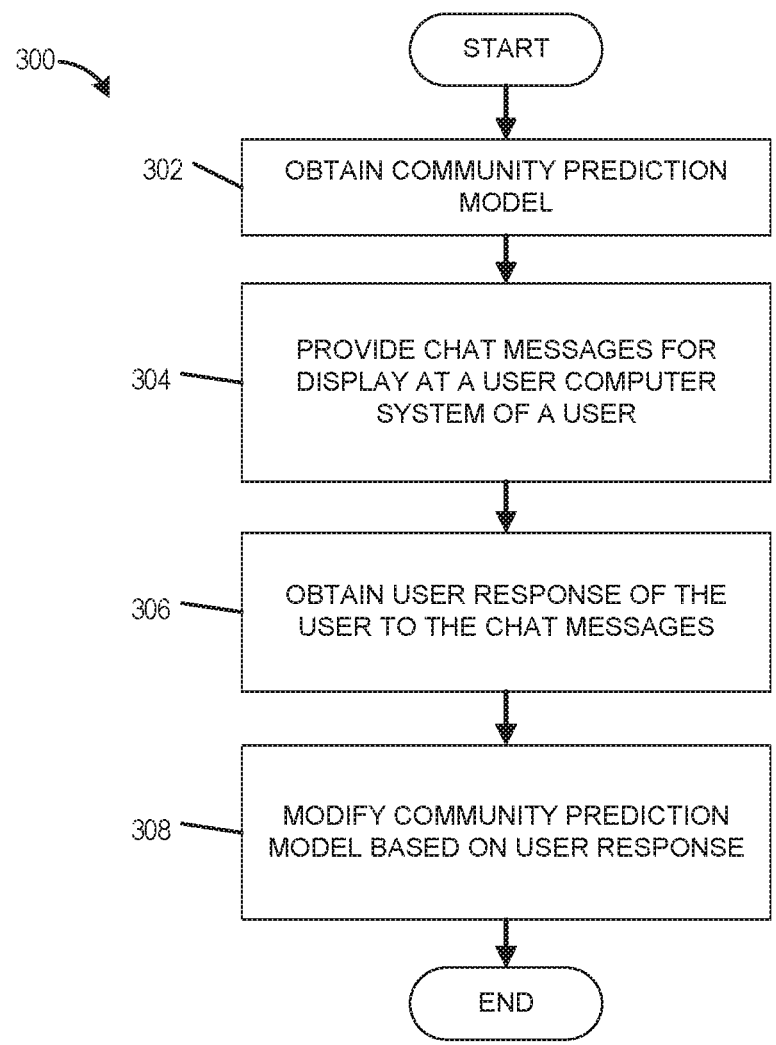
FIG. 3 presents a flowchart of an embodiment of a personalized prediction model generation process.

FIG. 3 presents a flowchart of an embodiment of a personalized prediction model generation process 300. The process 300 can be implemented by any system that can generate one or more user-specific parameter functions or prediction models that include one or more parameters. In some cases, the process 300 serves as a training process for developing one or more parameter functions or prediction models based on data obtained from a particular user. The process 300, in whole or in part, can be implemented by, for example, an interactive computing system 130, a toxicity analysis system 140, a model generation system 146, or a user computing system 110, among others. Although any number of systems, in whole or in part, can implement the process 300, to simplify discussion, the process 300 will be described with respect to particular systems. Further, it should be understood that the process 300 may be updated or performed repeatedly over time. For example, the process 300 may be repeated once per month, with the addition or release of a new video game, or with the generation of or access to an additional set of training data obtained from the particular user. However, the process 300 may be performed more or less frequently.

The process 300 begins at block 302 where the model generation system 146 obtains a community or global prediction model. The global prediction model may be a prediction model that is applied to all messages or to all users interacting with the video game 112. The community prediction model may be a prediction model that is applied to a particular set of users associated with a particular community. For example community prediction model may be a prediction model that is applied to users from a particular geographic area, users playing a particular video game, users playing a particular genre video game, users associated with a particular demographic, and the like.

In certain embodiments, the community prediction model or the global prediction model may be determined using a set of training data and the process 200. Alternatively, the community prediction model or the global prediction model may be a prediction model that is based on some baseline criteria used to identify the offensiveness of the message. This baseline criteria may be provided by an administrator or a publisher of the video game 112.

At block 304, the interactive computing 130 provides a set of one or more messages to a user computing system 110 for display to a user of the user computing system 110. The messages may be chat messages or other text-based communications that can be presented to a user. In some embodiments, the messages may be audio-based communications, which can be converted to text as part of the model generation process using, for example, the speech to text system 120 and/or the tone and sentiment analysis system 122. The messages may be presented to the user within an instance of the video game 112. For example, the messages may be presented to the user via a user interface generated by the video game 112. Alternatively, in certain embodiments, the messages may be presented to the user via a user interface provided by another application that can execute in conjunction with the video game 112 and/or that may interface with the video game 112.

The set of one or more messages provided to the user computing system 110 for display to the user may be a set of training messages generated by a publisher of or other entity associated with the video game 112. Alternatively, or in addition, the set of one or more messages may be messages obtained from other users using a chat or communication interface provided by the video game 112. In some embodiments, the one or more messages are provided to the user by the video game 112. For example, upon first loading or executing the video game 112, the video game 112 may be configured to provide a set of training messages to the user or the user to rate in terms of offensiveness. The set of training messages and ratings may be used by the process 300 to generate the user specific prediction model for predicting the offensiveness or toxicity of messages that may be received from other users of the video game 112 when the user is playing an instance of the video game 112.

At block 306, the interactive computing system 130 obtains or receives a user response from the user computing system 110 corresponding to the user's rating of the one or more messages. The user's rating of the one or more messages may be indicative of the user's determination of whether the one or more messages are offensive, or the degree to which the one or more messages are offensive. The block 306 may include receiving a separate rating for each of the one or more messages.

As previously described, a user response to a message indicating the offensiveness of the message may be a selection from a binary set of choices, such as a thumbs-up versus a thumbs down, a checkmark versus a cross, or a selection versus a non-selection associated with an indication of offensiveness. These binary values may be associated with a numerical value that can be used to facilitate determining a prediction model. Alternatively, the user response may be more nuanced than a simple indication of offensive or not offensive. For example, the user response may be a value associated with a scale of offensiveness. This value may be selected from any number of gradations within the scale. For example, the scale may present 3, 5, 10, 50, 100, any value in between the foregoing, or any other number of gradations within the scale with each gradation indicating a lesser or greater degree of offensiveness.

At block 308, the model generation system 146 modifies the community prediction model obtained at the block 302 based on one or more user responses received at the block 306. Modifying the community prediction model, or the global prediction model, may include providing the community prediction model or the global prediction model, the chat messages provided at the block 304, and the user responses to the chat messages obtained at block 306 as inputs to the model generation system 146. Alternatively, in certain embodiments, instead of modifying the community prediction model, the block 308 creates a new prediction model using the messages provided the block 304 and the responses to the messages obtained at the block 306 as input to the model generation system 146. In some embodiments, creating the new prediction model may include providing the messages and the user response to the messages of the block 304 and 306, respectively, to the model generation system 146 along with messages and responses to messages used to create the global or community prediction model. In other words, model generation system 146 may generate the user specific prediction model by providing the inputs used to generate the community prediction model and the user specific inputs obtained at the blocks 304 and 306 as inputs to the model generation system 146 to generate the user specific prediction model.

In certain embodiments, additional inputs may be provided to the model generation system 146 to facilitate generating the user specific prediction model. These additional inputs may include any type of context data associated with the video game 112 or the user playing the video game 112. For example, the context data may include an identity of the video game 112, a genre associated with the video game 112, demographic information associated with the user, identities of additional users that have a relationship with the user (for example friends or family members), or any other information that may modify whether the user is offended by a particular message. For example, as messages are presented to the user as part of the block 304, a context may be determined for the messages. This context may be associated with the messages and the offensiveness ratings provided by the user at the block 306, and may be provided to the model generation system 146 as an additional input to generate the prediction function.

This new prediction model may be associated with the user that is presented the messages at the block 304. The prediction model may be stored at the user data repository 142 and associated with an account of the user.

Example Machine Learning Process

Figure 4:
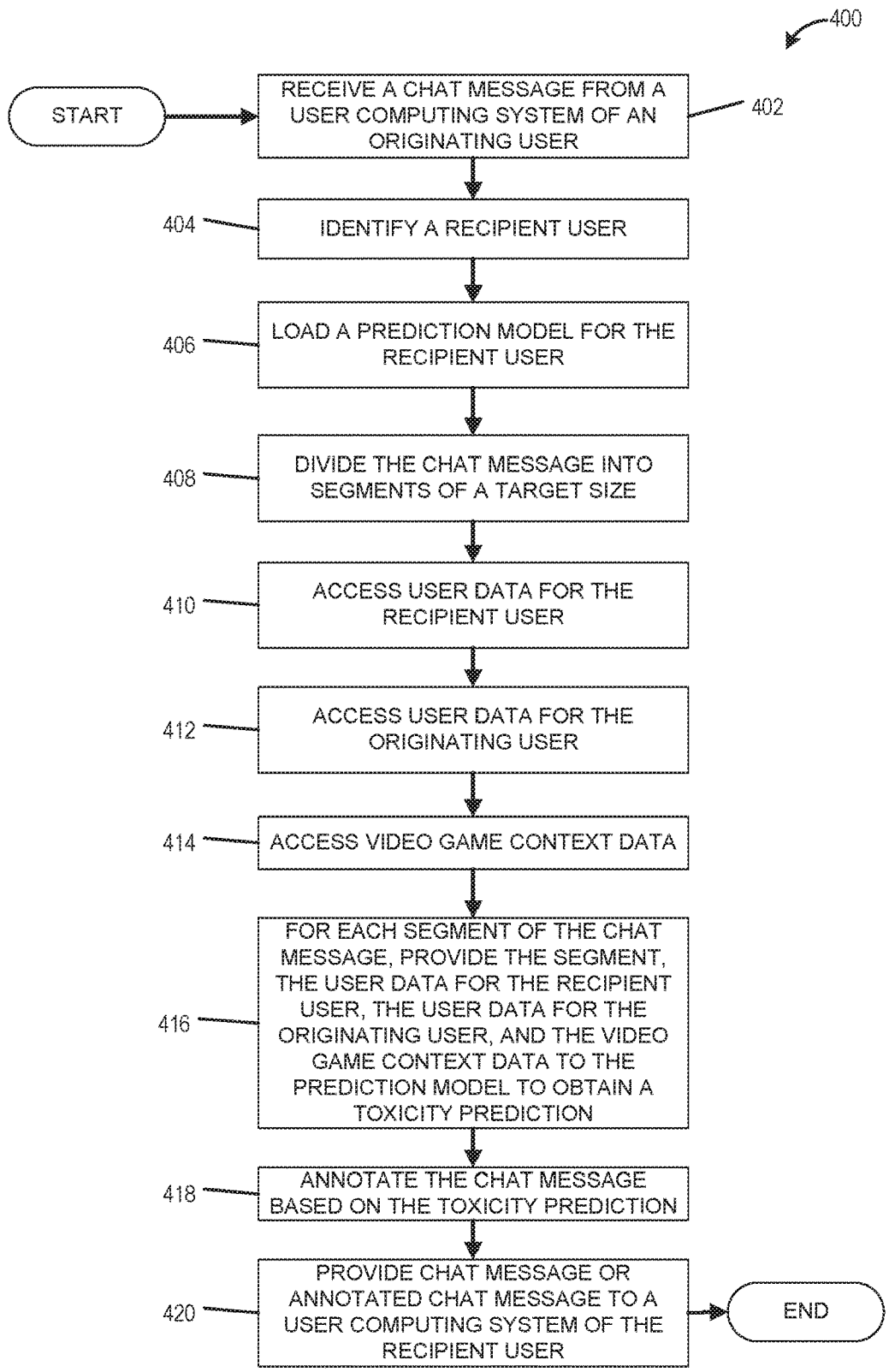
FIG. 4 presents a flowchart of an embodiment of a chat message toxicity assessment process.

FIG. 4 presents a flowchart of an embodiment of a chat message toxicity assessment process 400. The process 400 can be implemented by any system that can use a prediction model or parameter function to predict the toxicity or offensiveness of a message generated by a user of a video game 112. The process 400, in whole or in part, can be implemented by, for example, an interactive computing system 130, a text capture system 132, a text annotation system 134, a speech to text system 120, a tone and sentiment analysis system 122, a toxicity analysis system 140, a model generation system 146, or a user computing system 110, among others. Although any number of systems, in whole or in part, can implement the process 400, to simplify discussion, the process 400 will be described with respect to particular systems.

The process 400 begins at block 402 where the text capture system 132 receives a chat message from a user computing system 110 of an originating user. The chat message may be provided by a user interface included in the video game 112 or at the user computing system 110 to the application host system 138. The text capture system 132 may capture the chat message from the communication to the application host system 138. Alternatively, the application host system 138 may provide the chat message to the text capture system 132. In yet other embodiments, the video game 112 and/or the user computing system 110 may directly provide the chat message to the text capture system 132.

At block 404, the interactive computing system 130 identifies a recipient user that is to receive the chat message. The recipient user may be an intended target of the chat message or may be another user playing the video game 112 that may be presented with or see the chat message regardless of whether the chat message is intended for the user. For example, in some cases, a message typed or entered into a user interface by an originating user may be viewed by other users playing the same instance of the video game 112 as the user that generated the message. In some of these cases, the message may be intended for or directed to a particular user, but the remaining users playing the video game may also view the message. Identifying the recipient user may include determining a user identifier or an account identifier associated with an account used by the recipient user when playing the video game 112. In some embodiments, block 404 may include identifying a plurality of recipient users.

As previously described, the originating user may be a user that generates a message for display or to be provided to one or more other users. These one or more other users may be referred to as the recipient users. However, it should be understood that communication between users of the video game 112 may be two-way. Thus, users may be both originating users and recipient users. For example, in response to a message by an originating user, a recipient user may generate a responsive message and therefore become an originating user of the responsive message while the originating user of the original message may become a recipient user of the responsive message.

At block 406, the toxicity analysis system 140 loads a prediction model for the recipient user identified at the block 404. The prediction model may be loaded from a user data repository 142. Further, loading the prediction model may include identifying a prediction model associated with the recipient user at the user data repository 142. If a prediction model associated with the recipient user cannot be identified at the user data repository 142, the block 406 may include loading a global or community prediction model, or some other default prediction model that may be used in place of a user specific prediction model. A user specific prediction model may not be identified at the block 406 if recipient user has not performed a training process for modifying or generating a prediction model specific to the user.

In certain embodiments, the block 406 may be optional or omitted. For example, the prediction model for a recipient user may be loaded upon receipt of a first message. Accordingly, performance of the process 400 with respect to subsequent processes may omit performance of the block 406 because, for example, the prediction model may already be loaded. Similarly, the performance of the block 406 may be omitted in cases where the prediction model for each user is loaded as part of an initial sign-on process or initiation process of the video game 112. In other words, instantiating an instance of the video game 112 for joining an instance of the video game 112 and process may include automatically loading a prediction model of the user. By preloading the prediction model of the user, analysis of received messages may be performed more quickly.

At block 408, the text capture system 132 divides the chat message into segments of a target size. In certain embodiments, by reducing the size of the chat message, the prediction of the offensiveness of the message may be improved. For example, a relatively large message (for example, a message of several hundred words) that includes a substantially small amount (for example, a single word or two) of offensive content may be identified as not offensive despite the fact that the substantially small amount offensive content may render the message particularly offensive to some users. By dividing the relatively large message into smaller segments, the probability of identifying the message as offensive may be improved. In certain embodiments, the target size may be a particular size range. Further, the chat message may be divided into segments of varying size. By dividing the chat message into segments of varying size, at least partial context of particular phrases within the message may be maintained.

In some embodiments, dividing the chat message into segments may facilitate identifying portions of the chat message to annotate. For example, if a single segment is predicted to be offensive, but other segments of the message are not predicted to be offensive, the text annotation system 134 may annotate the offensive segment while leaving the other segments in their original form or without annotation.

In certain embodiments, the block 408 may be optional or omitted. For example, if the chat message is below a target size, or of dividing the chat message would result in one or more segments that are below a target size, the block 408 may be omitted.

At block 410, the interactive computing system 130 accesses user data for the recipient user. The user data may include any type of data that may facilitate predicting the offensiveness of the message. For example, the user data may include skill information of the user playing the video game 112, play history of the user playing the video game 112, chat history of user playing video game 112, demographic information of the user, social networking data (for example, whether the user has identified one or more other users playing the video game 112 including or excluding the originating user as friends within a social networking component or on a friends list associated with the video game 112), and any other data about the user. In some embodiments, some of the user data may be omitted. For example, in some cases, user data that is used to generate the prediction function as part of the process 300 may be omitted as an input during performance of the process 400. However, in other cases, user data supplied during the prediction model generation process 300 may also be used during application of the prediction model as part of the process 400.

At block 412, interactive computing system 130 accesses user data for the originating user. The user data for the originating user may include any of the types of user data described with respect to the block 410.

At block 414, interactive computing system 130 accesses video game context data for the video game 112. The video game context data may include any type of data about the video game 112 that impact the prediction of offensiveness of the message. For example, the video game context data may include a type or genre of the video game 112, a type of the user computing system 110 hosting the video game 112, an estimated location of the user computing system 110, a target audience of the video game 112, and the like. The video game context data may impact prediction of the offensiveness of the message because, for example, in some cases a user may find particular message more or less offensive depending on the type of video game the user is playing, who the user is playing with (for example with other adults or with children), or where the user is playing (for example, in a setting that is likely to be private or in a setting that may be public).

At block 416, for each segment of the chat message, the toxicity analysis system 140 provides the segment, the user data for the recipient user, the user data for originating user, and the video game context data to the prediction model loaded at the block 406 to obtain a toxicity prediction. As previously described, in some embodiments, the block 408 is optional or omitted. Thus, in certain embodiments, the block 416 includes providing the chat message in its entirety to the prediction model loaded at block 406. Further, in some embodiments, one or more of the blocks 410, 412, or 414 may be optional or omitted. Accordingly, in some embodiments, one or more of the user data for the recipient user, the user data for the originating user, or the video game context data may not be provided to the prediction model as part of the block 416.

In some embodiments, the block 416 may include aggregating or otherwise combining the toxicity prediction for each segment to obtain a single toxicity prediction for the overall message. In some cases, the toxicity prediction for the various segments may be averaged together. In other cases, the toxicity prediction for each of the segments may be maintained separately.

At block 418, the text annotation system 134 annotates the chat message based at least in part on the toxicity prediction determined at the block 416. Annotating the chat message may include rendering at least a portion of the chat message unreadable (for example, deleting, graying out, or otherwise marking up a portion of the message). In some embodiments, only portions of the chat message that are predicted to be offensive are annotated. In other embodiments, the entire chat message may be annotated or otherwise blocked. In some embodiments, the text annotation system 134 annotates the chat message if it is determined that the predicted toxicity is above a toxicity threshold.

At block 420, the interactive computing system 130 provides the chat message or the annotated chat message to a user computing system 110 of the recipient user. In some embodiments, interactive computing system 130 may prevent the chat message from being provided to the user computing system 110 of the recipient user. In some such cases, interactive computing system 130 may provide an indication to the user computing system 110 of the recipient user that a message was prevented from being provided to the user. Further, in some such cases, the user may elect whether to receive the message.

In embodiments where the annotated chat messages provided to the user computing system 110 of the recipient user, a reason that the chat message was annotated may be presented to the user. Further, the user may be given the option to receive the non-annotated version of the chat message. In certain embodiments where the chat messages annotated, the originating user may be informed that the chat message was annotated and may be presented with a reason for the annotation.

In certain embodiments, the process 400 may be repeated for each recipient user among a plurality of users that may receive the message generated by the originating user. As each recipient user may be associated with a different prediction function based on each user's determination of what is offensive, the annotation of a particular message may vary for each of the recipient users. Further, for some of the recipient users the message may not be annotated, while for other recipient users the message may be completely blocked or may be annotated in varying forms. Thus, during a single instance of the video game 112, different users may view different versions of a message generated by an originating user. Accordingly, in some cases, an adult may view offensive content while a child may be blocked from viewing offensive content. In other words, by using a personalized or user-specific prediction function, each user may have a personalized view of chat messages when playing the video game 112.

For some video games, each user may be presented with the same view or the same version of a message generated by an originating user. In some such embodiments, the prediction of toxicity or offensiveness for multiple recipient users may be obtained using the process 400. Further, in some such embodiments, the prediction of toxicity for the multiple recipient users may be aggregated or combined. In some such cases, the determination of whether to annotate and/or how much to annotate the message may be based on the aggregated prediction of toxicity for the multiple recipient users. The annotated or on annotated message may then be shown to each of the multiple recipient users. In other cases, the highest prediction of toxicity may be controlling. Thus, for example, if it is predicted that one user would find the message offensive, the message may be annotated regardless of whether the other users are likely to find the message offensive.

Advantageously, in certain embodiments, by annotating chat messages before providing them to recipient users, the toxicity that sometimes exists during video game chat sessions may be reduced or eliminated. Further, by using the machine learning processes described herein, is possible to more accurately identify the offensiveness of chat messages and to determine the offensiveness of chat messages before the messages are provided to recipient users. Thus, the gameplay experience of users may be improved, which, in some cases, may consequently improve the retention rate for users of the video game 112.

Overview of Computing System

Figure 5:
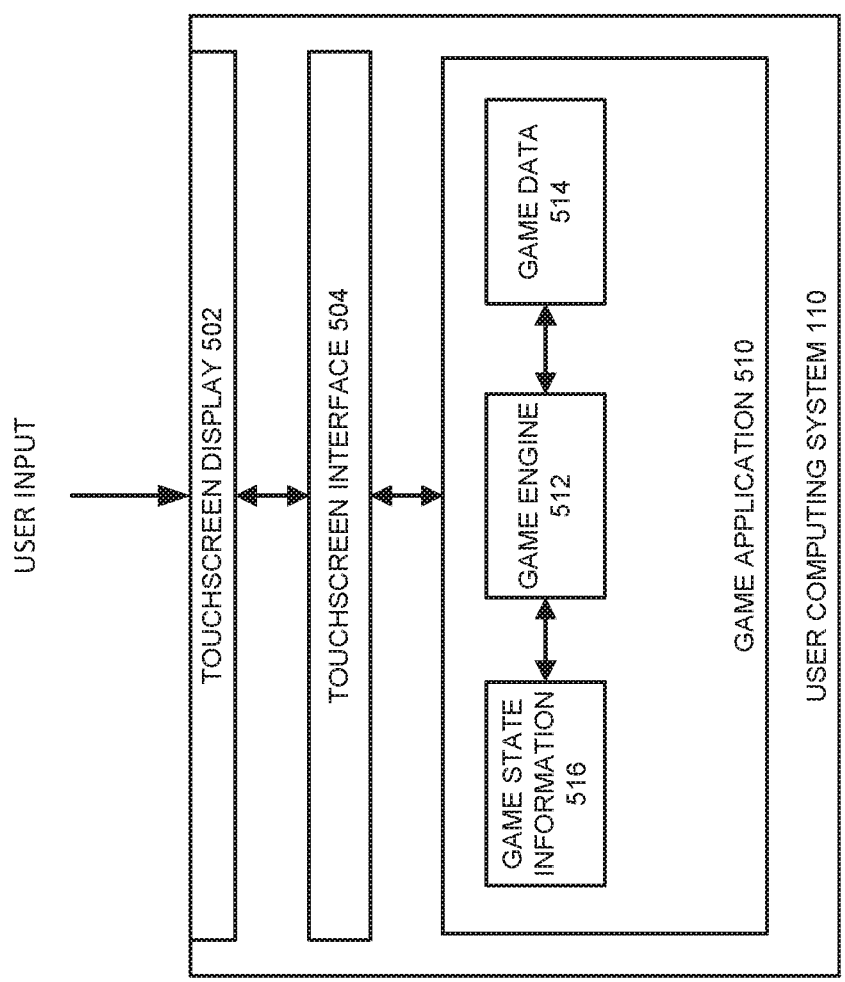
FIG. 5 illustrates an embodiment of a user computing system.

FIG. 5 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 6, the user computing system 110 is a touch-capable computing device capable of receiving input from a user via a touchscreen display 502. However, the user computing system 110 is not limited as such and may include non-touch capable embodiments, which do not include a touchscreen display 502.

The user computing system 110 includes a touchscreen display 502 and a touchscreen interface 504, and is configured to execute a game application 510. This game application may be the video game 112 or an application that executes in conjunction with or in support of the video game 112, such as a video game execution environment. Although described as a game application 510, in some embodiments the application 510 may be another type of application that may have a variable execution state based at least in part on the preferences or capabilities of a user, such as educational software. While user computing system 110 includes the touchscreen display 502, it is recognized that a variety of input devices may be used in addition to or in place of the touchscreen display 502.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 510. For example, the user computing system 110 may be a video game console. The game applications 510 executed by the user computing system 110 may be created using a particular application programming interface (API) or compiled into a particular instruction set that may be specific to the user computing system 110. In some embodiments, the user computing system 110 may be a general purpose computing device capable of executing game applications 510 and non-game applications. For example, the user computing system 110 may be a laptop with an integrated touchscreen display or desktop computer with an external touchscreen display. Components of an example embodiment of a user computing system 110 are described in more detail with respect to FIG. 6.

The touchscreen display 502 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 502. The touchscreen interface 504 can be configured to translate the touch input into data and output the data such that it can be interpreted by components of the user computing system 110, such as an operating system and the game application 510. The touchscreen interface 504 can translate characteristics of the tactile touch input touch into touch input data. Some example characteristics of a touch input can include, shape, size, pressure, location, direction, momentum, duration, and/or other characteristics. The touchscreen interface 504 can be configured to determine the type of touch input, such as, for example a tap (for example, touch and release at a single location) or a swipe (for example, movement through a plurality of locations on touchscreen in a single touch input). The touchscreen interface 504 can be configured to detect and output touch input data associated with multiple touch inputs occurring simultaneously or substantially in parallel. In some cases, the simultaneous touch inputs may include instances where a user maintains a first touch on the touchscreen display 502 while subsequently performing a second touch on the touchscreen display 502. The touchscreen interface 504 can be configured to detect movement of the touch inputs. The touch input data can be transmitted to components of the user computing system 110 for processing. For example, the touch input data can be transmitted directly to the game application 510 for processing.

In some embodiments, the touch input data can undergo processing and/or filtering by the touchscreen interface 504, an operating system, or other components prior to being output to the game application 510. As one example, raw touch input data can be captured from a touch input. The raw data can be filtered to remove background noise, pressure values associated with the input can be measured, and location coordinates associated with the touch input can be calculated. The type of touch input data provided to the game application 510 can be dependent upon the specific implementation of the touchscreen interface 504 and the particular API associated with the touchscreen interface 504. In some embodiments, the touch input data can include location coordinates of the touch input. The touch signal data can be output at a defined frequency. Processing the touch inputs can be computed many times per second and the touch input data can be output to the game application for further processing.

A game application 510 can be configured to be executed on the user computing system 110. The game application 510 may also be referred to as a video game, a game, game code and/or a game program. A game application should be understood to include software code that a user computing system 110 can use to provide a game for a user to play. A game application 510 might comprise software code that informs a user computing system 110 of processor instructions to execute, but might also include data used in the playing of the game, such as data relating to constants, images and other data structures. For example, in the illustrated embodiment, the game application includes a game engine 512, game data 514, and game state information 516.

The touchscreen interface 504 or another component of the user computing system 110, such as the operating system, can provide user input, such as touch inputs, to the game application 510. In some embodiments, the user computing system 110 may include alternative or additional user input devices, such as a mouse, a keyboard, a camera, a game controller, and the like. A user can interact with the game application 510 via the touchscreen interface 504 and/or one or more of the alternative or additional user input devices. The game engine 512 can be configured to execute aspects of the operation of the game application 510 within the user computing system 110. Execution of aspects of gameplay within a game application can be based, at least in part, on the user input received, the game data 514, and game state information 516. The game data 514 can include game rules, prerecorded motion capture poses/paths, environmental settings, constraints, animation reference curves, skeleton models, and/or other game application information. Further, the game data 514 may include information that is used to set or adjust the difficulty of the game application 510.

The game engine 512 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 510, the game application 510 can store game state information 516, which can include character states, environment states, scene object storage, and/or other information associated with a state of execution of the game application 510. For example, the game state information 516 can identify the state of the game application at a specific point in time, such as a character position, character action, game level attributes, and other information contributing to a state of the game application.

The game engine 512 can receive the user inputs and determine in-game events, such as actions, collisions, runs, throws, attacks and other events appropriate for the game application 510. During operation, the game engine 512 can read in game data 514 and game state information 516 in order to determine the appropriate in-game events. In one example, after the game engine 512 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 6:
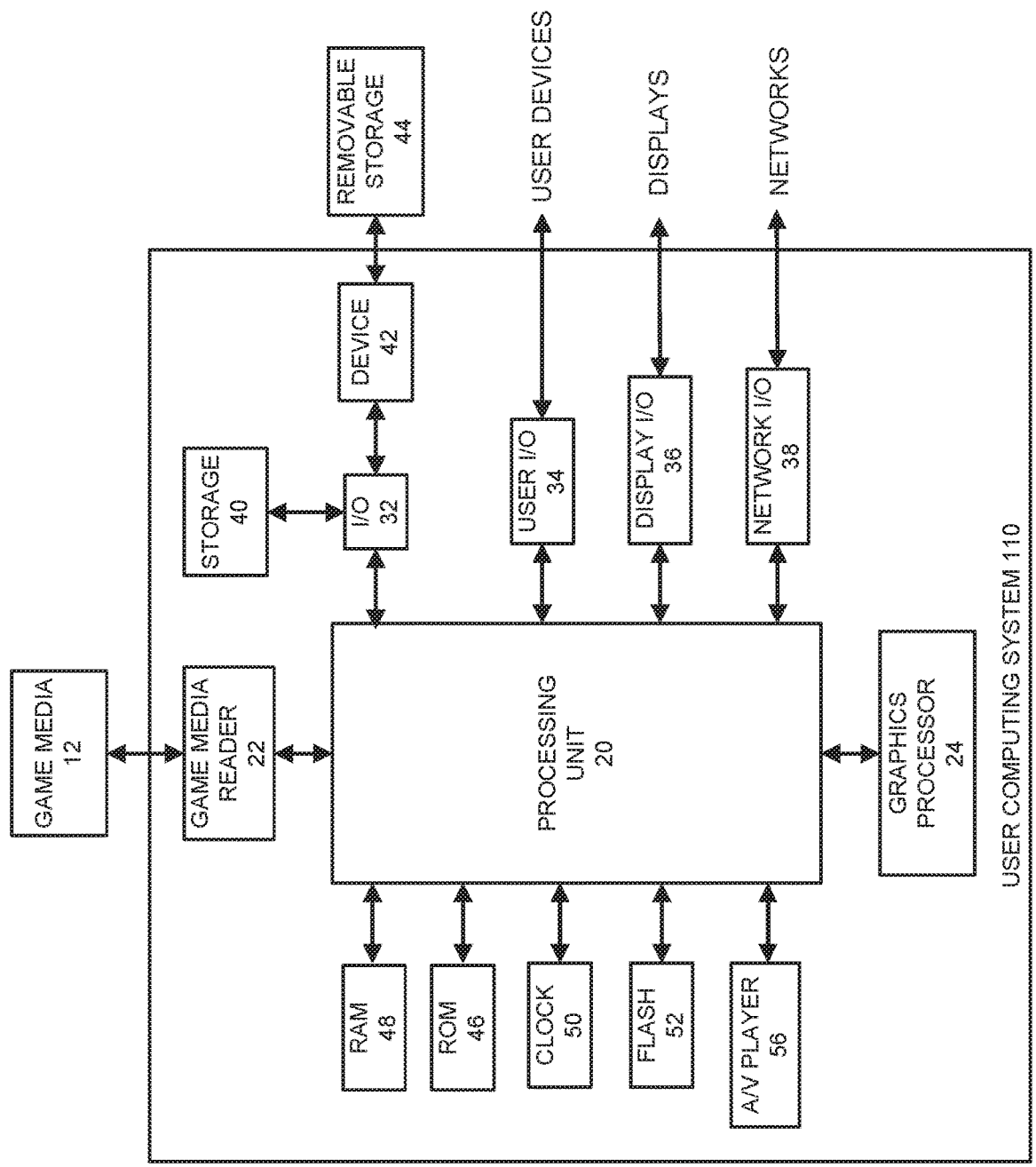
FIG. 6 illustrates an embodiment of a hardware configuration for the user computing system of FIG. 5.

FIG. 6 illustrates an embodiment of a hardware configuration for the user computing system 110 of FIG. 5. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 6) as described with respect to FIG. 5, the user computing system 110 may optionally include a touchscreen display 502 and a touchscreen interface 504.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 110. Processing unit 20 can communicate through I/O 32 to store data, such as game state data and any shared data files. In addition to storage 40 and removable storage media 44, computing device 110 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the computing device 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

ADDITIONAL EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
    as implemented by an interactive computing system configured with specific computer-executable instructions,
        receiving a text-based message from a first user computing system accessing a shared instance of a video game, the text-based message obtained from an originating user interacting with the shared instance of the video game, and the video game comprising a multiplayer video game that enables multiple users to play the shared instance of the video game together, wherein the text-based message is a non-annotated text-based message;
        identifying a first recipient user interacting with the shared instance of the video game;
        accessing a first prediction model associated with the first recipient user;
        providing at least the text-based message to the first prediction model to obtain a predicted toxicity of the text-based message;
        determining that the predicted toxicity of the text-based message satisfies a toxicity threshold;
        annotating the text-based message based at least in part on the predicted toxicity to obtain an annotated text-based message;
        providing the annotated text-based message to a second user computing system executing the shared instance of the video game for presentation to the first recipient user, wherein providing the annotated text-based message includes providing an indication that the text-based message has been annotated to the second user computing system;
        receiving a request from the second user computing system to access the non-annotated text-based message; and
        responsive to receiving the request, providing the non-annotated text-based message to the second user computing system.

2. The computer-implemented method of claim 1, wherein the text-based message is received at a user interface of the video game executing at the first user computing system.

3. The computer-implemented method of claim 1, wherein annotating the text-based message comprises rendering at least a portion of the text-based message unreadable to the first recipient user.

4. The computer-implemented method of claim 1, further comprising providing to the second user computing system, for presentation to the first recipient user, an indication of a reason that the text-based message has been annotated.

5. The computer-implemented method of claim 1, wherein said providing at least the text-based message to the first prediction model to obtain the predicted toxicity of the text-based message comprises:
    dividing the text-based message into a plurality of segments; and
    providing each of the plurality of segments to the first prediction model to obtain a predicted toxicity for each of the plurality of segments.

6. The computer-implemented method of claim 5, further comprising aggregating the predicted toxicity for each of the plurality of segments to obtain the predicted toxicity of the text-based message.

7. The computer-implemented method of claim 5, wherein said annotating the text-based message based at least in part on the predicted toxicity comprises annotating a first segment of the plurality of segments associated with a predicted toxicity that satisfies the toxicity threshold while not annotating a second segment of the plurality of segments associated with a predicted toxicity that does not satisfy the toxicity threshold.

8. The computer-implemented method of claim 1, further comprising:
    accessing context data; and
    providing at least the text-based message and the context data to the first prediction model to obtain the predicted toxicity of the text-based message.

9. The computer-implemented method of claim 8, wherein the context data comprises one or more of the following: a skill level for the originating user; a skill level for the first recipient user; relationship data between the originating user and the first recipient user; demographic data of the first recipient user; demographic data of the originating user; a genre of the video game; demographic data of one or more additional users accessing the shared instance of the video game; relationship data between the first recipient user and the one or more additional users; a type of the second user computing system; or a location of the second user computing system.

10. The computer-implemented method of claim 1, further comprising:
    identifying a second recipient user interacting with the shared instance of the video game using a third user computing system;
    accessing a second prediction model associated with the second recipient user;
    providing at least the text-based message to the second prediction model to obtain a second predicted toxicity of the text-based message;
    determining that the second predicted toxicity of the text-based message does not satisfy the toxicity threshold; and providing a non-annotated copy of the text-based message to the third user computing system for presentation to the second recipient user.

11. The computer-implemented method of claim 1, further comprising generating a global prediction model that determines a prediction of toxicity for text-based messages, wherein said generating the global prediction model comprises:
  accessing a set of training data, the training data comprising a set of text-based messages with varying levels of toxicity as rated by a set of users;
  accessing a set of toxicity ratings for each of the text-based messages of the set of text-based messages as determined by the set of users; and
  using a machine learning algorithm to determine the global prediction model parameter function based at least in part on the set of training data and the set of toxicity ratings.

12. The computer-implemented method of claim 1, further comprising generating the first prediction model by at least:
  accessing a global prediction model;
  presenting a set of training text-based messages to the first recipient user;
  obtaining a set of toxicity ratings for each of the training text-based messages of the set of training text-based messages from the first recipient user; and
  modifying the global prediction model based at least in part on the set of training text-based messages and the set of toxicity ratings to obtain the first prediction model.

13. The computer-implemented method of claim 12, wherein modifying the global prediction model to obtain the first prediction model comprises providing the global prediction model, the set of training text-based messages, and the set of toxicity ratings to a machine learning algorithm.

14. The computer-implemented method of claim 1, wherein the first user computing system and the second user computing system execute the shared instance of the video game by executing at least a portion of the video game.

15. A system comprising:
  an electronic data store configured to store prediction models that predict the offensiveness of chat messages within a video game that permits multiple user to play the video game together; and
  a hardware processor in communication with the electronic data store, the hardware processor configured to execute specific computer-executable instructions to at least:
    receive a chat message from a first user computing system accessing a shared instance of the video game, the chat message obtained from a first user interacting with the shared instance of the video game, wherein the chat message is a non-annotated chat message;
    identify a second user interacting with the shared instance of the video game using a second user computing system;
    access from the electronic data store a first prediction model associated with the second user;
    provide at least the chat message to the first prediction model to obtain a predicted offensiveness of the chat message;
    determine that the predicted offensiveness of the chat message satisfies an offensiveness threshold;
    annotate the chat message based at least in part on the predicted offensiveness to obtain an annotated chat message;
    provide the annotated chat message to the second user computing system for presentation to the second user, wherein the annotated chat message includes an indication that the chat message has been annotated;
    receive a request from the second user computing system to access the non-annotated chat message; and
    responsive to receiving the request, provide the non-annotated chat message to the second user computing system.

16. The system of claim 15, wherein the hardware processor is further configured to annotate the chat message to render at least a portion of the chat message unreadable to the second user.

17. The system of claim 15, wherein the hardware processor is further configured to provide at least the chat message to the first prediction model by at least:
  dividing the chat message into a plurality of segments; and
  providing each of the plurality of segments to the first prediction model to obtain a predicted offensiveness for each of the plurality of segments, wherein the hardware processor is further configured to determine the predicted offensiveness of the chat message based on the predicted offensiveness of each of the plurality of segments.

18. The system of claim 15, wherein the hardware processor is further configured to:
  identify a third user interacting with the shared instance of the video game using a third user computing system;
  access from the electronic data store a second prediction model associated with the third user;
  provide at least the chat message to the second prediction model to obtain a second predicted offensiveness of the chat message;
  determine that the second predicted offensiveness of the chat message does not satisfy the offensiveness threshold; and
  provide a non-annotated copy of the chat message to the third user computing system for presentation to the third user.

19. The system of claim 15, wherein the hardware processor is further configured to generate the first prediction model by at least:
  presenting a set of training chat messages to the second user;
  obtaining an offensiveness rating for each training chat message of the set of training chat messages from the second user; and
  using a machine learning algorithm to generate the first prediction model based at least in part on the set of training chat messages and the offensiveness rating for each training chat message of the set of training chat messages.

20. The system of claim 15, wherein the hardware processor is further configured to generate the first prediction model by at least:
  accessing a global offensiveness prediction model generated based on training data obtained from a plurality of users;
  presenting a set of training chat messages to the second user;

obtaining an offensiveness rating for each training chat message of the set of training chat messages from the second user; and using a machine learning algorithm to modify the global offensiveness prediction model based at least in part on the set of training chat messages and the offensiveness rating for each training chat message of the set of training chat messages to generate the first prediction model.

* * * * *